US005615553A

United States Patent [19]

Lourigan

[11] Patent Number: 5,615,553

[45] Date of Patent: Apr. 1, 1997

[54] HYDRAULIC CIRCUIT WITH LOAD SENSING FEATURE

[75] Inventor: Patrick M. Lourigan, Kenosha, Wis.

[73] Assignee: Case Corporation, Racine, Wis.

[21] Appl. No.: 496,063

[22] Filed: Jun. 28, 1995

[51] Int. Cl.$^6$ .................................................... F16D 31/02

[52] U.S. Cl. ................................................ 60/422; 60/486

[58] Field of Search ............................ 60/421, 422, 430, 60/484, 486, 494; 91/28, 29, 32

[56] References Cited

U.S. PATENT DOCUMENTS

| | | | |
|---|---|---|---|
| 2,643,516 | 6/1953 | Carlson | 91/28 X |
| 3,037,354 | 6/1962 | Tennis | 91/28 X |
| 3,535,877 | 10/1970 | Becker et al. | 60/421 X |
| 3,543,516 | 12/1970 | Treichel | 60/422 X |
| 4,030,296 | 6/1977 | Deinlein-Kalb | 60/486 |
| 4,170,113 | 10/1979 | Kittle et al. | 60/484 X |
| 4,209,984 | 7/1980 | Kittle et al. | 60/430 X |
| 4,335,577 | 6/1982 | Lobmeyer et al. | 60/421 |
| 4,470,260 | 9/1984 | Miller et al. . | |
| 4,559,965 | 12/1985 | Mickelson | 91/28 X |
| 5,063,739 | 11/1991 | Bianchetta et al. | 60/421 |
| 5,148,676 | 9/1992 | Moriya et al. | 60/422 X |
| 5,211,014 | 5/1993 | Kropp | 60/421 |
| 5,289,680 | 1/1994 | Obe et al. . | |
| 5,313,795 | 5/1994 | Dunn . | |
| 5,446,979 | 9/1995 | Sugiyama et al. | 60/422 X |

*Primary Examiner*—John E. Ryznic
*Attorney, Agent, or Firm*—Jansson & Shupe, Ltd.

[57] ABSTRACT

A hydraulic circuit has a first PV pump connected to a valve group for powering a plurality of hydraulic mechanisms connected to the group, and a second PF pump connected in the circuit. In the improvement, a hydraulic line extends between the second pump and the valve group and there is a conductor sensing a mechanism load pressure. A valve network directs flow from the second pump to the valve group when the difference between the pressure in the hydraulic line and the load pressure declines below a predetermined value. Such decline "signals" that the mechanisms require more fluid than is available from the first pump alone. A new method for supplementing the flow of a first pump with that of a second pump is also disclosed.

13 Claims, 3 Drawing Sheets

HYDRAULIC CIRCUIT WITH LOAD SENSING FEATURE

FIELD OF THE INVENTION

This invention relates generally to power plants and, more particularly, to power plants which transfer power using hydraulic fluid under pressure.

BACKGROUND OF THE INVENTION

Hydraulic pumps and motors and the fluid (oil, synthetic liquids or the like) used with them are commonly employed for transferring power from one location to another. A very common type of hydraulic circuit includes a hydraulic pump driven by a "prime mover" source of power such as an electric motor or an internal combustion engine. The pump draws oil from a tank and delivers such oil under pressure to one or more control valves. The control valve(s) direct pressurized oil to one or more hydraulic output mechanisms used to perform useful work. Exemplary output mechanisms include hydraulic cylinders (sometimes referred to as linear motors) and rotary hydraulic motors.

Hydraulic circuits can be (and are) used in a wide variety of applications and offer very good control of the output mechanism powered by such circuit. Because the circuit components, i.e., pumps, valves, motors and the like, can be connected to one another using flexible hoses, hydraulic circuits transfer power in situations where it is not possible (or at least not practical) to use straight, rigid mechanical drive lines for that purpose. And when compared to mechanical drive lines, hydraulic circuits offer superior "controllability."

Many types of hydraulically-powered machines involve hydraulic output mechanisms, e.g., hydraulic motors, the sizes and maximum speeds of which are known to the designer and do not change over the life of the machine. For example, a self-propelled agricultural combine for harvesting row crops and grain has a number of hydraulic mechanisms, the power requirements of which are known to the designer. The hydraulic motor(s), pump(s), valve(s) and the like are sized in anticipation of known mechanism load characteristics.

But design engineers do not always have the luxury of "predictability of load." Some hydraulic machines are specifically configured in anticipation of having any of a wide variety of equipment types powered by the hydraulic circuit on such machine. A good example is an agricultural tractor.

Such tractors are used to pull equipment such as a towed combine, a crop sprayer, a crop planter or a forage harvester, to name but a few. Each type of equipment has its own hydraulic mechanisms which will likely differ as to number and flow and pressure requirements from those of another equipment type.

And the precise make and model of the equipment which may be towed by a particular tractor is not known to the designer. Of course, purchasers of tractors are not required to inform the tractor seller of all of the types of towed equipment that may be used with such tractor. And in any event, such equipment may change over time. It is fair to say that in the foregoing examples, the tractor is the "power supply" for the towed equipment used therewith.

These facts present a challenge to the designer of the tractor hydraulic circuit who must anticipate the number and types of hydraulic mechanisms on the equipment being towed and powered by the tractor. And the flow requirements of such mechanisms vary widely.

A common practice when designing certain known hydraulic circuits is to select pumps which, in both number and maximum output flow of each, will meet the needs of the highest anticipated equipment flow requirement. As a result, such circuits have excess flow capacity for many types of less-demanding equipment—one or more hydraulic pumps may be utilized only a small percentage of the tractor operating time. To state it another way, the pumping capacity is selected for maximum load requirements and is underutilized during "off-peak" operating periods.

The inclusion of such pumping capacity can be burdensome to both the tractor designer and the user. The designer must find locations on the tractor to mount pumps (which are driven by the tractor internal combustion engine) and must consider the added cost thereof when setting the tractor selling price. And the tractor user is required to maintain such pumps and keep them operating.

An approach to minimizing the installed pumping capacity on a machine involves what is known as "load sensing." U.S. Pat. No. 4,470,259 (Miller et al.) describes a closed-center load-sensing hydraulic system having a pressure-compensated, variable-displacement pump and two functions "prioritized" one to the other. The primary work circuit (e.g., steering system) is given priority in flow over a secondary work circuit. U.S. Pat. No. 4,470,260 (Miller et al.) shows a similar system which is open-center and uses a fixed-displacement pump. Both Miller et al. systems are said to alleviate steering wheel "kickback."

The system of the Miller et al. '259 patent is configured so that the vehicle steering system has priority and controls whether pump flow is directed only to the steering system, to both the steering and secondary work circuits or only to the secondary work circuits. The system of the Miller et al. '260 patent initially directs all fluid to the primary work circuit and then, depending upon rising load pressure in the primary circuit, to both the primary and secondary work circuits or to the secondary work circuit alone.

To put it in other words, the Miller et al. systems employ a single pump for powering two functions. The systems "favor" the primary function and shift pump flow to the secondary function only when the primary function is satisfied.

The system described in U.S. Pat. No. 5,289,680 (Obe et al.) has three hydraulic pumps. The first pump normally powers a working implement but its flow can be manually valved to join the flow of a second pump which powers what the patent calls an auxiliary actuator. U.S. Pat. No. 5,313,795 (Dunn) describes a tri-path pressure selector network that prioritizes the flow of a pump to a vehicle braking system. When the needs of such system are satisfied, pump flow is available for other functions.

While these prior art systems have been generally satisfactory for their intended purposes, they are less-than-ideally suited for applications where the nature of the load mechanisms to be powered by the system is not fully known. The system of the Obe et al. patent relies upon manual valve manipulation to shift the flow of one pump between two circuits, one of which is also "fed" by a second pump. It is difficult for an operator to know when a mechanism needs additional hydraulic flow (and when it does not) and in any event, manual manipulation often results in reduced machine efficiency.

The rationale underlying the systems of the Miller et al. patents is to always "favor" the primary work circuit over a secondary circuit rather than to direct pump flow to the primary circuit only during peak demand. This approach is clearly appropriate where the primary work circuit involves steering or braking but less than satisfactory for powering other implement mechanisms.

A new hydraulic circuit which minimizes the pumping capacity installed on a machine, which supplements main pump flow only during peak demand imposed by the hydraulic mechanisms being powered, which is automatic in operation and which takes advantage of the operating characteristics of a variable-delivery pump and the simplicity of a fixed-delivery pump would be an important advance in the art.

OBJECTS OF THE INVENTION

It is an object of the invention to provide an improved circuit and method for supplementing hydraulic flow that overcomes certain disadvantages and shortcomings of the prior art.

Another object of the invention is to provide an improved load-sensing circuit and method which minimize the pumping capacity installed on a machine.

Another object of the invention is to provide an improved circuit which supplements main pump flow only during peak demand as evidenced by variations in a load-related pressure.

Still another object of the invention is to provide an improved circuit and method for supplementing flow which is automatic in operation.

Another object of the invention is to provide an improved circuit and method for supplementing flow which takes advantage of the operating characteristics of a variable-delivery pump and the simplicity of a fixed-delivery pump.

Another object of the invention is to provide an improved circuit and method which only functions when a load-related pressure is within a predetermined range of pressures.

Yet another object of the invention is to provide an improved circuit and method for supplementing flow which are useful to power hydraulic mechanisms, the load characteristics of which are only generally known and may change. How these and other objects are accomplished will become apparent from the following descriptions and from the drawings.

SUMMARY OF THE INVENTION

The invention involves a hydraulic circuit having (a) a first pump connected to a valve group for powering a plurality of hydraulic mechanisms connected to the group. That is, each valve in the valve group is adapted to be connected to a separate mechanism such as a hydraulic cylinder, a hydraulic rotary motor or the like. The circuit also has a second pump connected in the circuit.

In the improvement, a hydraulic line extends between the second pump and the valve group and carries fluid from such pump to the group when the flow demand of the mechanisms is greater than that available from the first pump. A conductor such as a small-diameter hydraulic tube "senses" a mechanism load pressure. The circuit includes a valve network which directs flow from the second pump along the line to the valve group when the difference between the pressure in the hydraulic line and the load pressure declines below a predetermined value. The flow from the second pump thereby supplements the flow from the first pump. In a highly-preferred embodiment, the first pump is a pressure-limited, flow-compensated variable-delivery pump and the second pump is a fixed-delivery pump.

More specifically, the valve group includes at least two control valves, each controlling a separate hydraulic mechanism and each manipulated by the operator of the machine upon which the circuit is mounted. In one specific embodiment (in which the first pump is adequate to power any one of the mechanisms but may not be adequate to power the two highest-flow mechanisms), the conductor is at (i e., "senses") a load pressure only when both control valves are actuated.

The valve network used to control when the second pump supplements "first-pump" flow includes a first valve and a diverter valve. The first valve is coupled between the conductor and the diverter valve and connects the conductor and the diverter valve to one another when both control valves are actuated. If the first valve and the valves in the valve group are electrically-actuated, one preferred way of controlling the first valve is to actuate it whenever the two valves in the valve group (or any two valves if the group has three or more valves) are actuated.

In another aspect of the inventive circuit, the second pump is connected to a branch circuit having a first line connecting such pump to the valve group and a second line connecting the second pump to a circuit device such as an oil filter, an oil cooler and/or a manifold for lubricating machine clutch plates, bearings and the like. The second line has a pilot-operated, two-way diverter valve with primary and secondary control-pressure input ports for sensing primary and secondary pilot pressure, respectively. The diverter valve is spring-biased to the closed position.

The primary input port is connected to be at the load pressure of one of the mechanisms and the secondary input port is connected to the second line. In a highly preferred circuit, the pressure at the primary input port will be greater than that at the secondary input port although the difference between such pressures may not be sufficient to retain the diverter valve (which is spring-biased toward the closed direction) in an open position.

When the difference between the pressure at the secondary input port and that at the primary input port is less than some predetermined value, the diverter valve closes under the urging of its biasing spring and blocks the second line. With the second line blocked, the flow of the second pump is diverted to the first line. In other words, the diverter valve closes when the differential control pressure across it declines to or below some first predetermined value.

In yet another aspect of the invention, the load-pressure-sensing conductor extends between the valve group and a bypass valve. Such bypass valve is open when the pressure in the load-sensing-conductor exceeds a second predetermined value which is greater than the first predetermined value. Opening the bypass valve causes the sensed load pressure applied to the primary input port to decline to near-zero (the bypass valve connects the conductor to tank), the diverter valve opens and flow from the second pump is directed to the second line rather than to supplement the flow of the first pump.

The machine on which the new circuit is mounted may also have an accessory valve for controlling a machine function such as a hydraulically-positioned hitch used for towing the implement, the mechanisms of which are being powered by the circuit. In a specific exemplary embodiment, the accessory valve is connected to the first line in parallel with the valve group and the primary input port may sense the load pressure of the machine function. The primary input port of the diverter valve is at the greater of (a) the load pressure of the machine function, e.g., the hitch, or (b) the load pressure of one of the mechanisms.

Another aspect of the invention involves a new method for supplementing flow in a hydraulic circuit. The method comprises the steps of sensing the pressure in a hydraulic line extending between the second pump and the valve group, sensing a mechanism load pressure and directing flow from the second pump to the valve group when the difference between the pressure in the hydraulic line and the load pressure declines below a predetermined value. In a more specific method, the step of sensing a mechanism load pressure includes actuating the two control valves.

In the new method, the directing step includes actuating the diverter valve. Such actuation is by applying the load pressure to a primary input port of the diverter valve, applying the pressure in the hydraulic line to a secondary input port of the diverter valve and actuating the diverter valve when the difference between the pressure at the secondary input port and that at the primary input port declines below a predetermined value.

The new method recognizes that it may not be necessary to supplement the flow of the first pump with that of the second unless the sensed load pressure is above some predetermined value. Accordingly, the circuit includes a shutoff valve opened by load pressure and the step of sensing a mechanism load pressure includes opening the shutoff valve when the load pressure exceeds a shutoff-valve actuation pressure.

When the shutoff valve is employed, the circuit includes the first valve, the shutoff valve and the diverter valve. The step of sensing the mechanism load pressure includes actuating the first valve and actuating the shutoff valve, both to open positions.

Other details of the invention are set forth in the following detailed description and in the drawings.

DETAILED DESCRIPTIONS OF PREFERRED EMBODIMENTS

Figure 1:
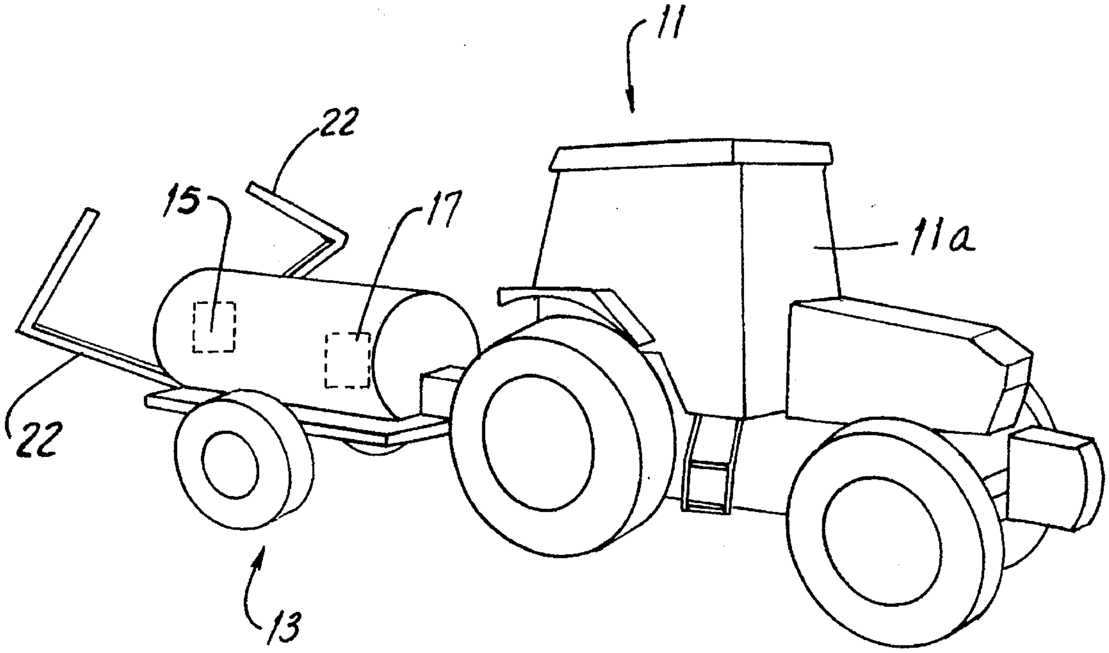
FIG. 1 is a perspective view of an exemplary machine, i.e., an agricultural tractor, and towed equipment, i.e., a crop sprayer, associated with the tractor. In this example, the tractor hydraulic circuit powers mechanisms on the sprayer.
Figure 2:
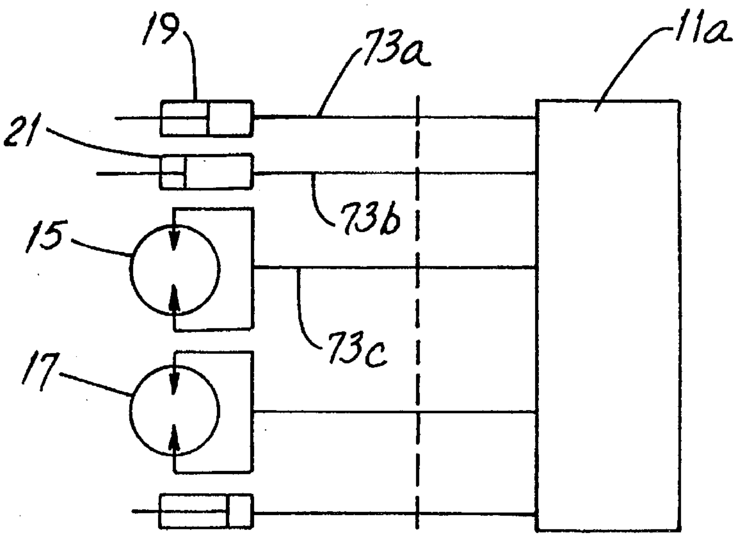
FIG. 2 is a representation of how the tractor of FIG. 1 power hydraulic mechanisms on the crop sprayer.

Before describing the new circuit 10 and method, it will be helpful to have an understanding of an exemplary type of application in which such circuit 10 may be used. Referring first to FIGS. 1 and 2, an exemplary machine 11, i.e., an agricultural tractor 11*a*, is coupled to and tows a crop sprayer 13. A typical sprayer 13 has hydraulic mechanisms such has motors 15 and 17 for powering the spray pump and a mixture agitator, respectively. There are also hydraulic cylinders 19, 21 for raising and lowering the spray bars 22 and for unfolding and folding them.

The crop sprayer 13 has no internal combustion engine of its own. The tractor 11*a* is the "drawbar vehicle" that tows the sprayer 13 through a field and powers the various mechanisms on such sprayer 13.

The general arrangement of the first embodiment of the new circuit 10 will be described next. That description is followed by a description of the second embodiment of the circuit 10 and, finally, by a description of the operation of the new circuit 10.

Description of the Circuit—First Embodiment

Figure 3:
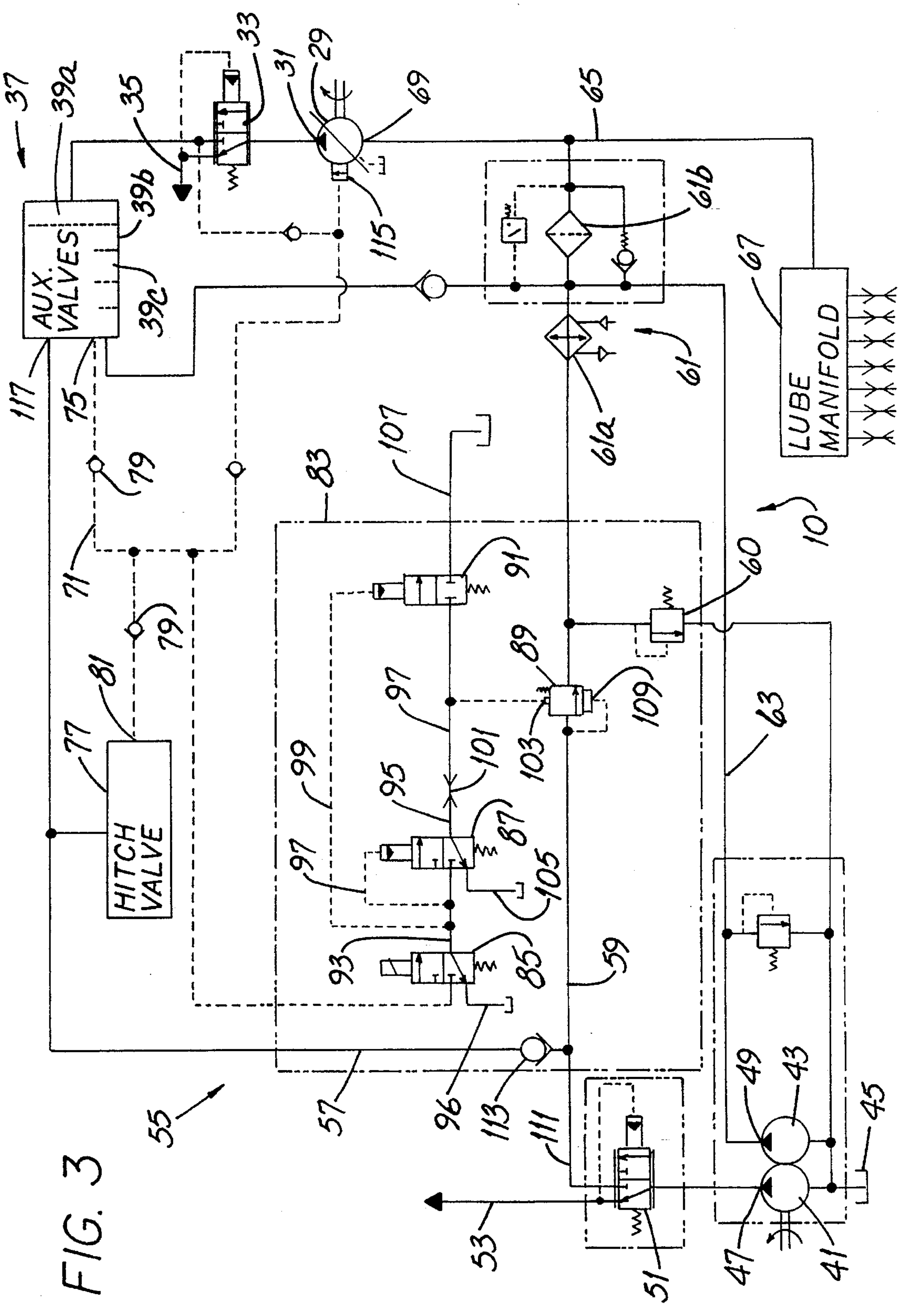
FIG. 3 is a diagram of one embodiment of the new hydraulic circuit incorporating a load sensing feature for supplementing flow.

Referring next to FIG. 3, the new circuit 10 has a first pump 29, the discharge port 31 of which is connected through a priority valve 33 to an ancillary function such as a steering system (powered via the line 35) and to a valve group 37 for powering two or more hydraulic mechanisms. The priority valve 33 functions to assure that the flow from the pump 29 is available to the valve group 37 only if the needs of the steering system are first met.

The group 37 has two or more independently-operable control valves 39*a*, 39*b*, 39*c*, each for controlling a separate mechanism connected thereto. Merely as an example, the mechanisms may be the motors 15, 17 and the cylinders 19, 21 of the sprayer 13 shown in FIGS. 1 and 2. In the preferred embodiment, the pump is a pressure and flow-compensated variable-delivery pump.

The circuit also has second and third pumps 41 and 43, respectively, connected in such circuit 10. The pumps 41 and 43 draw oil (or other hydraulic fluid) from a tank and discharge such oil under pressure from their respective outlet ports 47 and 49. All of the pumps 29, 41 and 43 are coupled to and driven by the tractor engine.

Flow from the second pump 41 is directed to a pressure-regulating valve 51 which assures that the pressure in the line 53 is maintained at some level, e.g., 275 p.s.i. Pressurized oil in the line 53 is used to operate the tractor torque-converter transmission, brakes or the like, the oil volume requirements of which are very modest.

Assuming the pressure in the line 53 is at the desired level, the valve 51 directs flow from the pump 41 to a branch circuit 55, the first line 57 of which connects the second pump 41 to the valve group 37. The second line 59 of the branch circuit 55 connects the second pump 41 to a circuit device 61 such as an oil cooler 61*a* and oil filter 61*b*. (Cold, viscous oil in the line 59 may cause the pressure in such line 59 to rise above desirable limits. The relief valve 60 limits such pressure to about 500 p.s.i.) Flow from the third pump 43 is along the line 63 to the filter 61*b*.

Oil flowing through the filter 61*b* is directed to a line 65 connected to another ancillary function (e.g., a lubrication manifold 67 providing oil to cool clutch plates, lubricate bearings and the like) and to the inlet 69 of the first pump 29. While the inlets of the second and third pumps 41, 43 draw oil from the tank 45, the inlet 69 of the first pump 29 is "supercharged" by connecting it (indirectly) to lines from the discharge ports 47 and 49 of the pumps 41 and 43, respectively.

The circuit 10 also has a conductor 71, the pressure in which is related to a load pressure and is about equal to such load pressure, e.g., the pressure in one of the lines 73*a*, 73*b* or 73*c* shown in FIG. 2. It will be recalled that each control valve 39*a*, 39*b*, 39*c* in the group 37 is controlling or may be called upon to control a different hydraulic mechanism, e.g., a motor 15, cylinder 19 or the like. The valve group 37 includes a "logic network" (not shown but of a known type)

which causes the higher or highest pressure in a line 73*a*, 73*b*, 73*c* powering any mechanism then being operated to be that pressure at the port 75. Subject to the existence of a higher load pressure in the accessory valve 77 described below, the pressure at the port 75 will be that prevailing in the conductor 71.)

The exemplary circuit 10 also has an accessory valve 77 for controlling a function of the tractor 11*a*. As an example, the valve 77 may control the hydraulically-adjustable tractor hitch. The check valves 79 assure that the higher of the two load pressures at the ports 75 and 81 will be that prevailing in the conductor 71.

The branch circuit 55 (involving the lines 57 and 59) is part of a valve network 83. As will become apparent from the description of operation, such network 83 directs flow from the second pump 41 to the valve group 37 when the difference between the pressure in the line 59 and the load-related pressure in the conductor 71 declines below a predetermined value. In the exemplary embodiment, such pressure difference is about 250 p.s.i.

The network 85 includes a first valve 83, a shutoff valve, 87 a diverter valve 89 and a bypass valve 91, all of which are connected (in ways described below) to the conductor 71. The first valve 85 is configured and connected in such a way that when the valve 85 is in the illustrated position, the pressure in the conductor 71 is blocked, i.e., is prevented from extending to the conductor 93, conductor 95 and conductor 97. The conductor 93 is vented to tank by the line 96. And when the valve 85 is in the open position, the pressure in the conductor 71 extends to the conductor 93.

The shutoff valve 87 and the bypass valve 91 have pilot lines 97 and 99, respectively, which are connected to the conductor 93 "upstream" of conductor 95 and the pressure-reducing orifice 101. The primary input port 103 of the diverter valve 89 is connected to the conductor 97 "downstream" of the orifice 101.

The shutoff valve 87 is spring-biased to a position (as shown) which blocks the conductor 93 and vents the conductor 95 to tank along the line 105. And when the shutoff valve 87 is open, the pressure in conductor 93 extends to conductor 95. In an exemplary embodiment, the shutoff valve 87 is open when the pressure in the conductor 93 is about 750 p.s.i. or greater.

The bypass valve 91 is also spring-biased to a position (as shown) which blocks the conductor 97 and prevents the conductor 97 from being vented to tank along the line 107. When the bypass valve 91 is open, the pressure in the conductors 71, 93, 95, 97 and 107 is near zero. In an exemplary embodiment, the bypass valve 91 is open when the pressure in the conductor 93 is about 2250 p.s.i. or greater.

As noted above, the diverter valve 89 (preferably a venting-type relief valve) has its primary input port 103 connected to the conductor 97. Such conductor 97 is nominally at the higher or highest pressure of any mechanism connected to the group 37 and then being operated and (if the machine 11 is so equipped) of any function connected to the accessory valve 77. The secondary input port 109 is connected to the line 59.

The diverter valve 89 is spring-biased toward a closed position as shown. Such valve 89 is pressure-biased to an open position whenever the difference between the lower pressure at the primary input port 103 (i.e., in the line 97) and the higher pressure at the secondary input port 109 is greater than a predetermined value, otherwise referred to herein as a first predetermined value.

To state it in other terms, the diverter valve 89 is closed and thereby directs flow from the second pump 41 to the valve group 37 along the line 57 when the difference between the lower pressure in the hydraulic line 97 and the higher pressure of line 59 declines below a first predetermined value. In the exemplary circuit 10, such value is about 250 p.s.i. (It is to be appreciated that pressurized oil flowing in the line 111 must flow along either the line 59 or, if such line 59 is blocked by the diverter valve 89, across the check valve 113 and along the line 57.)

Description of the Circuit—Second Embodiment

Figure 4:
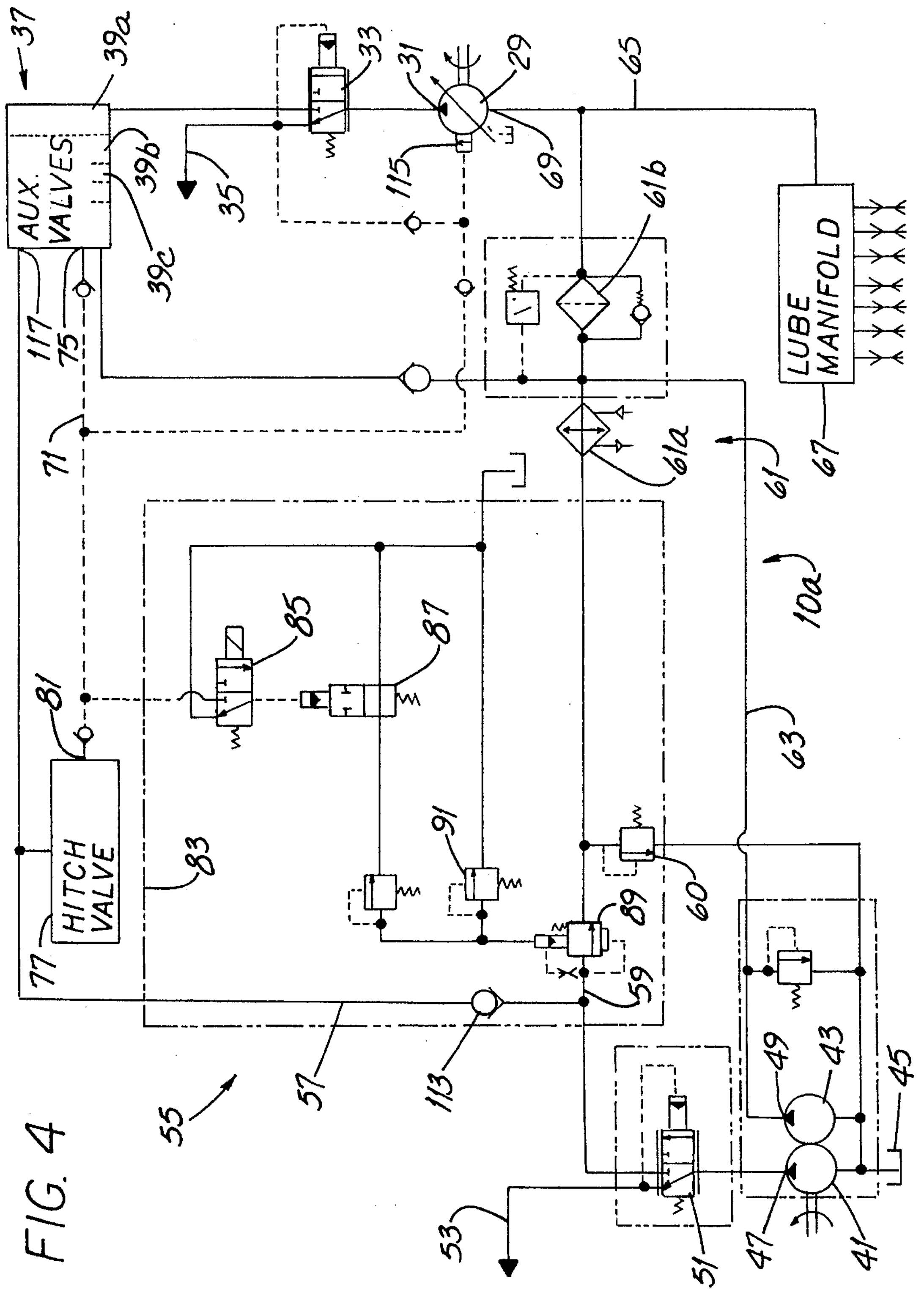
FIG. 4.is a diagram of another embodiment of the new hydraulic circuit.

The circuit 10*a* of FIG. 4 differs from that of FIG. 3 in the way in which the valve network 83 is configured. More specifically, the diverter valve 89, the bypass valve 91, the first valve 85 and the shutoff valve 87 are connected differently. However, the valves 85, 87, 89 and 91 operate in the same way as described above with respect to FIG. 3 and the function of the circuit 10*a* is the same. That is, the circuit 10*a* of FIG. 4 senses load and supplements flow to the valve group 37 in the same manner as the circuit 10 of FIG. 3.

Operation

When analyzing the circuits 10 and 10*a* and the following portion of the specification, it will be helpful to appreciate a few key points. One is that the first pump 29 is of the flow-compensated type and, as an example, has a "standby" pressure setting of about 350 p.s.i.

That is, the pump 29 is configured in such a way that it will attempt to maintain a pressure at its discharge port 31 which is about 350 p.s.i. higher than the load pressure imposed by the conductor 71 upon the pump control 115. As an example, if a mechanism such as a motor 15 attached to the group 37 is at a load pressure of 1400 p.s.i., the pressure at the pump discharge port 31 will be about 1750 p.s.i.

Another key point is that the pressure in the line 57 attached to the secondary inlet 117 of the valve group 37 is about equal to the maximum load pressure of the load pressures of the two or more mechanisms attached to such group 37, i.e., is equal to about 1400 p.s.i. in the example.

As noted in the Summary, if the first valve 85 and the valves 39*a*, 39*b*, 39*c* in the valve group 37 are electrically-actuated, one preferred way of controlling the first valve 85 is to actuate it whenever two valves 39 in the valve group 37 (or any two valves 39 if the group 37 has three or more valves) are actuated. To put it another way, the load sensing and flow supplementing features of the highly-preferred embodiments of circuits 10 and 10*a* are able to function only if two or more mechanisms, e.g., motor(s) 15, 17 and/or cylinder(s) 19, 21 are being operated.

Yet another key point is that in the exemplary embodiment, the minimum pressure "differential" across the input ports 103, 109 which is needed to hold the diverter valve 89 in an open position is about 250 p.s.i. If the pressure at the primary input port 103 is near zero, pressure of slightly over 250 p.s.i. in the line 59 will bias the valve 89 to an open position and permit oil from the second pump 41 to flow to the cooler 61*a* and filter 61*b* and thence to the line 65. Considering the foregoing, there is normally a difference of about 100 p.s.i. between the actual pump standby pressure (equal to the highest pressure in the lines 73*a*, 73*b*, 73*c* increased by 350 p.s.i.) and the "inlet" pressure in the line 59 to the diverter valve 89.

However, if the aggregate flow demand imposed on the pump 29 by the mechanisms connected to the group 37 is greater than the maximum flow available from such pump 29, the pump control will not be able to maintain the pressure at the pump outlet port 31 at the 350 p.s.i. level above the load pressure at the port 75 and sensed in the conductor 71. Stated another way, if more oil is being demanded than is available, the standby pressure will diminish to a value which is less than the exemplary 350 p.s.i. above the discharge port pressure of pump 29. And it is important to appreciate that a higher-than-available demand is evidenced and attended by a declining load pressure.

If the pressure difference which is normally 350 p.s.i. falls below 250 p.s.i., the diverter valve 89 shifts to its illustrated closed position and oil from the pump 41 flows through the check valve 113 to the secondary inlet port 117 and supplements the flow from the pump 29. When the flow requirement again declines to a level such that the requirement can be supplied entirely by the pump 29, the pressure of the pump 29 will "rebuild" to maintain the normal 350 p.s.i difference. Thereupon, the diverter valve 89 again opens, the check valve 113 closes and oil from the pump 41 flows to the cooler 61*a*, filter 61*b*, manifold 67 and pump inlet 69 as before.

As used in this specification, the term "variable-delivery pump" means a pump having an output flow (at an exemplary drive speed) which can be varied by changing pump displacement or otherwise. The term "fixed-delivery pump" means a pump having a nominal predetermined or non-variable output flow at an exemplary drive speed. As applied to a pressure, the term "sense" or "sensing" means to detect, detecting or to "pick up" or "picking up" such pressure by a hydraulic line, conductor or pressure transducer connected thereto.

While the principles of the invention have been shown and described in connection with only a few embodiments, it is to be understood clearly that such embodiments are exemplary and not limiting. Two circuit embodiments have been described. After understanding the foregoing, persons of ordinary skill in the art will readily recognize how the invention can be made using, e.g., electrically-operated valves controlled by pressure transducers.

I claim:

1. In a hydraulic circuit having (a) a first pump connected to a valve group for powering a plurality of hydraulic mechanisms connected to the group, and (b) a second pump connected in the circuit, the improvement comprising:

a hydraulic line extending between the second pump and the valve group;

a conductor sensing a mechanism load pressure;

and wherein:

the valve group includes at least two control valves, each controlling a separate hydraulic mechanism; and the conductor is at a load pressure when both control valves are actuated;

the circuit includes a valve network directing flow from the second pump to the valve group when the difference between the pressure in the hydraulic line and the load pressure declines below a predetermined value, whereby the flow from the second pump supplements the flow from the first pump.

2. The circuit of claim 1 wherein:

the network includes a first valve and a diverter valve;

the first valve is connected between the conductor and the diverter valve; and the first valve connects the conductor and the diverter valve when both control valves are actuated.

3. The circuit of claim 1 wherein:

the valve group includes at least three control valves, each controlling a separate hydraulic mechanism;

the conductor is at a load pressure when any two of the control valves are actuated;

the network includes a first valve and a diverter valve;

the first valve is connected between the conductor and the diverter valve; and the first valve connects the conductor and the diverter valve when the said two of the control valves are actuated.

4. The circuit of claim 3 wherein the first pump is a flow-compensated variable-displacement pump and the second pump is a fixed-displacement pump.

5. In combination, a machine and a hydraulic circuit having (a) a first pump connected to a valve group for powering a plurality of hydraulic mechanisms connected to the group, and (b) a second pump connected in the hydraulic circuit, the improvement wherein:

the second pump is connected to a branch circuit having a first line connecting the second pump to the valve group and a second line connecting the second pump to a circuit device;

the second line includes a diverter valve having primary and secondary input ports for sensing primary and secondary pilot pressure, respectively;

the primary input port is at the load pressure of one of the mechanisms and the secondary input port is at the pressure in the second line;

the diverter valve directs the flow of the second pump to the first line when the difference between the pressure at the secondary input port and that at the primary input port is less than a predetermined value; and the machine includes an accessory valve connected to the first line in parallel with the valve group.

6. The circuit of claim 5 wherein the diverter valve is closed and blocks the second line, thereby directing the flow of the second pump to the first line.

7. The circuit of claim 6 wherein the predetermined value is a first predetermined value and wherein:

a load-pressure-sensing conductor extends between the valve group and a bypass valve; and the bypass valve is open when the pressure in the load-sensing-conductor exceeds a second predetermined value which is greater than the first predetermined value.

8. The combination of claim 5 wherein the primary input port is at the greater of (a) the load pressure of the machine function or (b) the load pressure of one of the mechanisms.

9. A method for supplementing flow in a hydraulic circuit having (a) a first pump connected to a valve group for powering a plurality of hydraulic mechanisms connected to the group, the valve group including at least two control valves each controlling a separate hydraulic mechanism, and (b) a second pump connected in the circuit, the method comprising the steps of:

sensing the pressure in a hydraulic line extending between the second pump and the valve group;

sensing a mechanism load pressure;

actuating the two control valves; and directing flow from the second pump to the valve group when the difference between the pressure in the hydraulic line and the load pressure declines below a predetermined value, thereby using the flow from the second pump to supplement the flow from the first pump.

10. The method of claim 9 wherein the circuit includes a shutoff valve opened by load pressure and the step of sensing a mechanism load pressure includes opening the shutoff valve when the load pressure exceeds a shutoff-valve actuation pressure.

11. The method of claim 9 wherein the circuit includes a first valve, a shutoff valve and a diverter valve and the step of sensing the mechanism load pressure includes:

actuating the first valve; and actuating the shutoff valve.

12. The method of claim 11 wherein the directing step includes actuating the diverter valve.

13. The method of claim 12 wherein the step of actuating the diverter valve includes:

applying the load pressure to a primary input port of the diverter valve;

applying the pressure in the hydraulic line to a secondary input port of the diverter valve; and actuating the diverter valve when the difference between the pressure at the secondary input port and that at the primary input port is less than a predetermined value.

* * * * *

UNITED STATES PATENT AND TRADEMARK OFFICE
CERTIFICATE OF CORRECTION

PATENT NO. : 5,615,553

DATED : April 1, 1997

INVENTOR(S) : Patrick M. Lourigan

It is certified that error appears in the above-identified patent and that said Letters Patent is hereby corrected as shown below:

In column 7, line 21, delete "The network 85 includes a first valve 83, a shutoff valve," and insert --The network 83 includes a first valve 85, a shutoff valve,--

Signed and Sealed this

Fifteenth Day of July, 1997

*Attest:*

BRUCE LEHMAN

*Attesting Officer*

*Commissioner of Patents and Trademarks*